(12) United States Patent
Porcs

(10) Patent No.: US 8,701,819 B2
(45) Date of Patent: Apr. 22, 2014

(54) CONSOLE BRACKET FOR ATTACHMENT TO LOWER CONSOLE

(75) Inventor: Robert Anthony Porcs, Waterford, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/435,468

(22) Filed: Mar. 30, 2012

(65) Prior Publication Data

US 2013/0257077 A1  Oct. 3, 2013

(51) Int. Cl.
*B60K 20/00* (2006.01)

(52) U.S. Cl.
USPC ............... 180/336; 29/453; 296/24.34

(58) Field of Classification Search
USPC .......... 180/336; 296/24.34; 74/473.1, 473.15, 74/523; 29/453
See application file for complete search history.

(56) References Cited

U.S. PATENT DOCUMENTS

| | | | | |
|---|---|---|---|---|
| 4,691,960 A * | 9/1987 | Miyadera | ...................... | 296/37.8 |
| 5,287,743 A * | 2/1994 | Doolittle et al. | .......... | 74/471 XY |
| 5,887,485 A * | 3/1999 | VanOrder et al. | .......... | 74/473.15 |
| 5,970,814 A * | 10/1999 | Smith et al. | ................. | 74/473.15 |
| 6,267,217 B1 * | 7/2001 | Malone et al. | ................. | 192/218 |
| 7,017,788 B2 * | 3/2006 | Trambley et al. | ............. | 224/326 |
| 7,513,550 B1 | 4/2009 | Abro et al. | | |
| 7,571,661 B2 * | 8/2009 | Blondeel et al. | ............. | 74/473.1 |
| 7,631,917 B2 * | 12/2009 | Kwolek | ..................... | 296/24.34 |
| 7,874,603 B2 * | 1/2011 | Stoner | ........................ | 296/24.34 |
| 7,992,915 B2 * | 8/2011 | Kwolek | ......................... | 296/70 |
| 8,033,588 B2 * | 10/2011 | Luginbill et al. | .......... | 296/24.34 |
| 8,292,019 B2 * | 10/2012 | Hisazumi et al. | ............. | 180/274 |
| 2008/0098849 A1 * | 5/2008 | Wang | .............................. | 74/523 |

* cited by examiner

*Primary Examiner* — Paul N Dickson
*Assistant Examiner* — Timothy Wilhelm
(74) *Attorney, Agent, or Firm* — Gifford, Krass, Sprinkle, Anderson & Citkowski, P.C.

(57) ABSTRACT

A console assembly for a vehicle and installment method are provided wherein the console is installed around a vehicle shifter assembly. The assembly includes a main body wherein the main body includes a shifter assembly mounted thereon, an elongated bracket mounted to the shifter assembly wherein the elongated bracket includes at least two protrusions, and a console assembly having at least two elongated portions wherein each of the elongated portions includes an inner wall. Attachment structures operable to accept the protrusions of the elongated bracket are mounted on the inner walls of the elongated portions of the center console. The center console having the at least two elongated portions is mounted over the shifter onto the elongated bracket allowing the at least two protrusions of the elongated bracket to attach to the means to accept the at least two protrusions thereby eliminating the need for any additional bolts or screws.

12 Claims, 4 Drawing Sheets

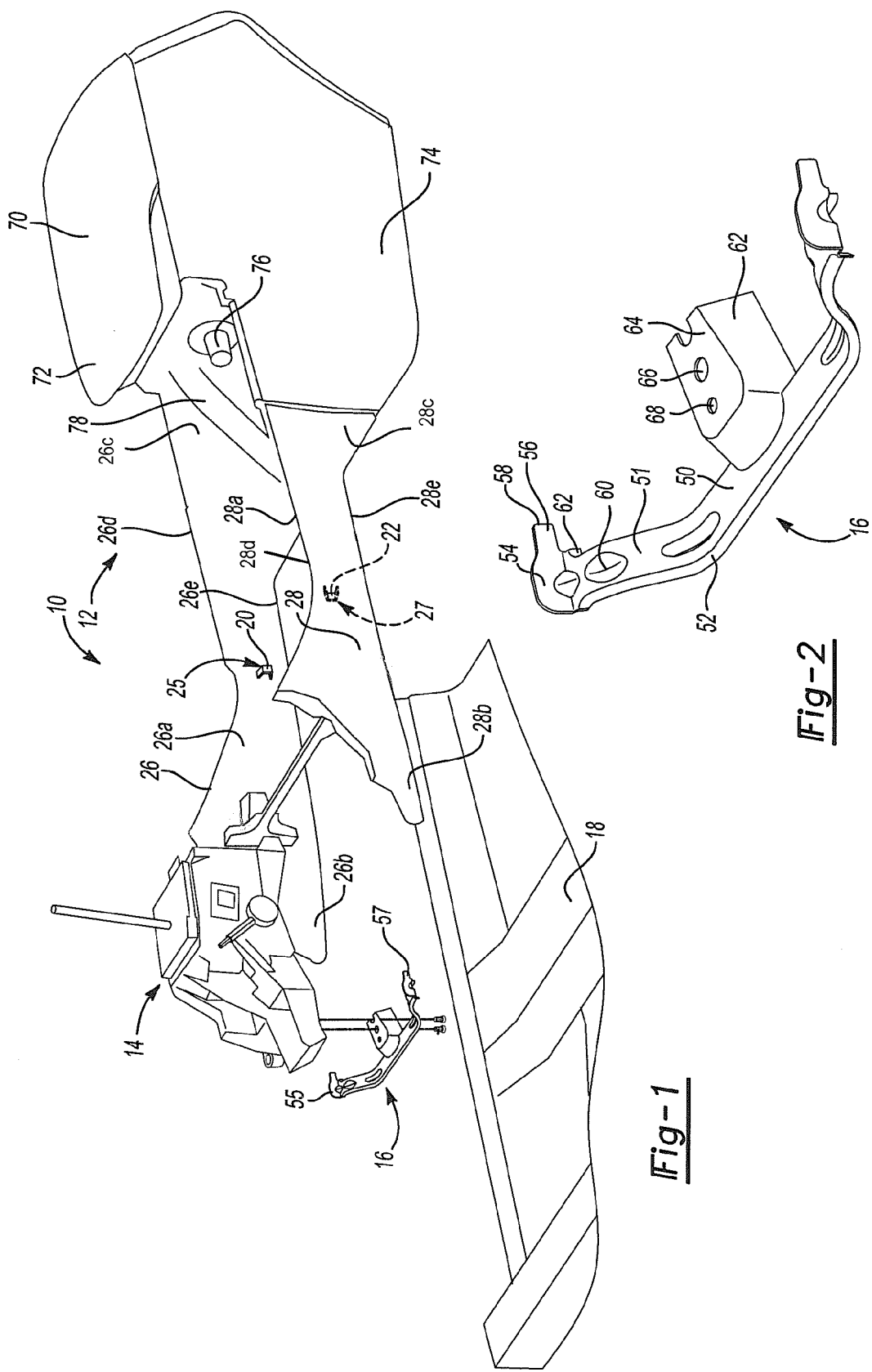

CONSOLE BRACKET FOR ATTACHMENT TO LOWER CONSOLE

FIELD OF THE INVENTION

This invention relates generally to attachment structures. More particularly, this invention relates to a bracket for attachment to a shifter and console assembly.

BACKGROUND OF THE INVENTION

Installation of a console assembly requires numerous bolts or screws to attach the console assembly to the main body of the vehicle. While the bolts or screws provide a secure installation of the console assembly to the vehicle, installation of said bolts is a difficult task to be completed by the assembly line worker. The addition of bolts to attach the console assembly to the main body is time consuming for the assembly line worker and often requires difficult angles to reach the areas requiring the screw or bolt. The difficulty of the addition of bolts or screws makes the assembly line worker's job much more straining and time consuming. Accordingly, there exists a need in the art to provide a means for quickly installing a center console without the use of screws or bolts at the installation site.

SUMMARY OF THE INVENTION

The present invention provides for a console assembly for a vehicle wherein the console is installed around a vehicle shifter assembly. The assembly includes a main body wherein the main body includes a shifter assembly mounted thereon, an elongated bracket mounted to the shifter assembly wherein the elongated bracket includes at least two protrusions, and a console assembly having at least two elongated portions wherein each of the elongated portions includes an inner wall. Attachment structures operable to accept the protrusions of the elongated bracket are mounted on the inner walls of the elongated portions of the center console. The center console having the at least two elongated portions is mounted over the shifter onto the elongated bracket allowing the at least two protrusions of the elongated bracket to attach to the means to accept the at least two protrusions thereby eliminating the need for any additional bolts or screws.

BRIEF DESCRIPTION OF THE DRAWINGS

FIG. 1 illustrates a perspective exploded view of a center console and bracket assembly mounted to a main body of a vehicle;

FIG. 2 illustrates a perspective view of the elongated bracket;

DETAILED DESCRIPTION OF THE INVENTION

Figure 3:
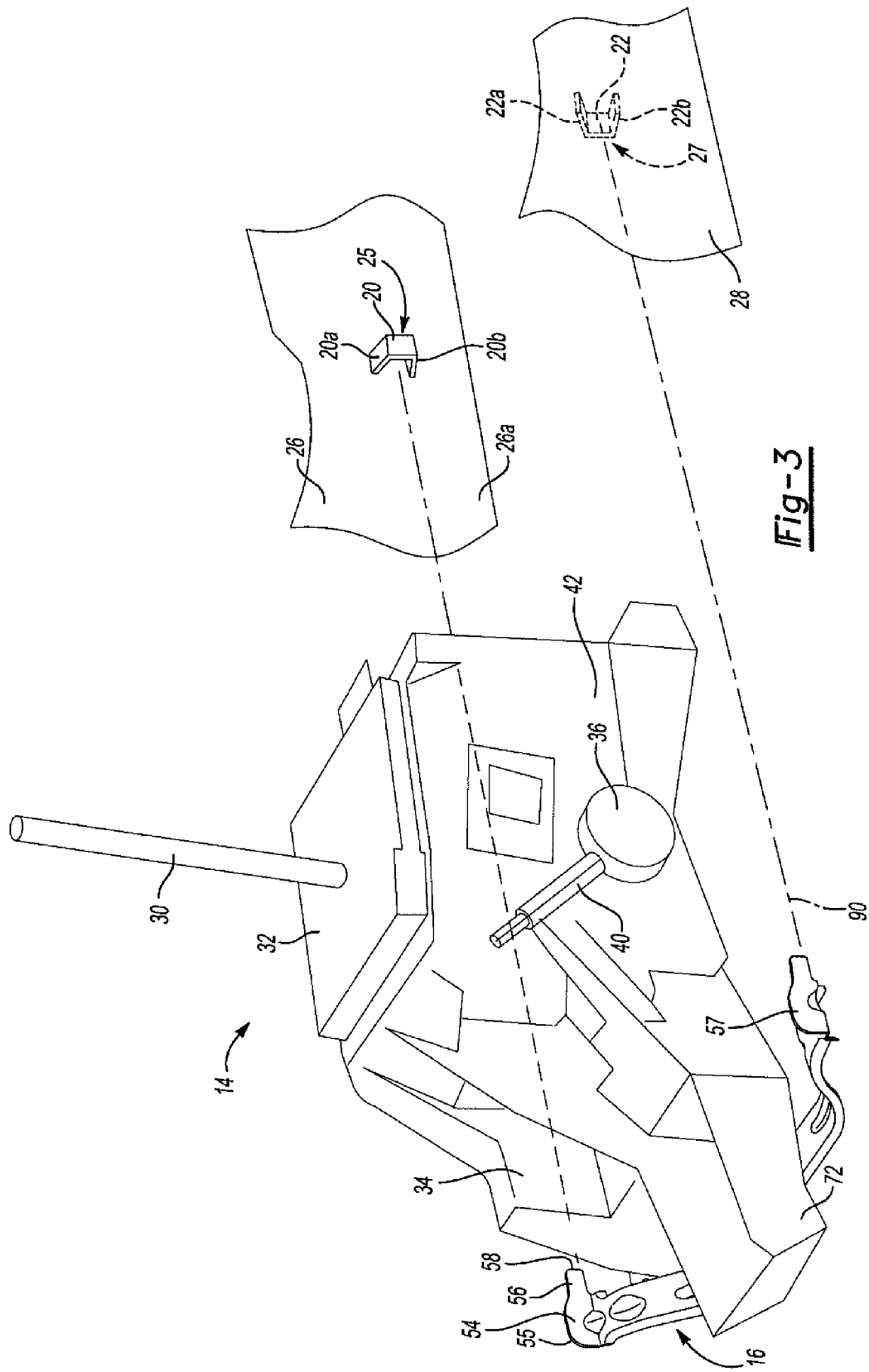
FIG. 3 illustrates a perspective view of the shifter assembly having the elongated bracket attached thereto and corresponding attachment means located on the console assembly.
Figure 4:
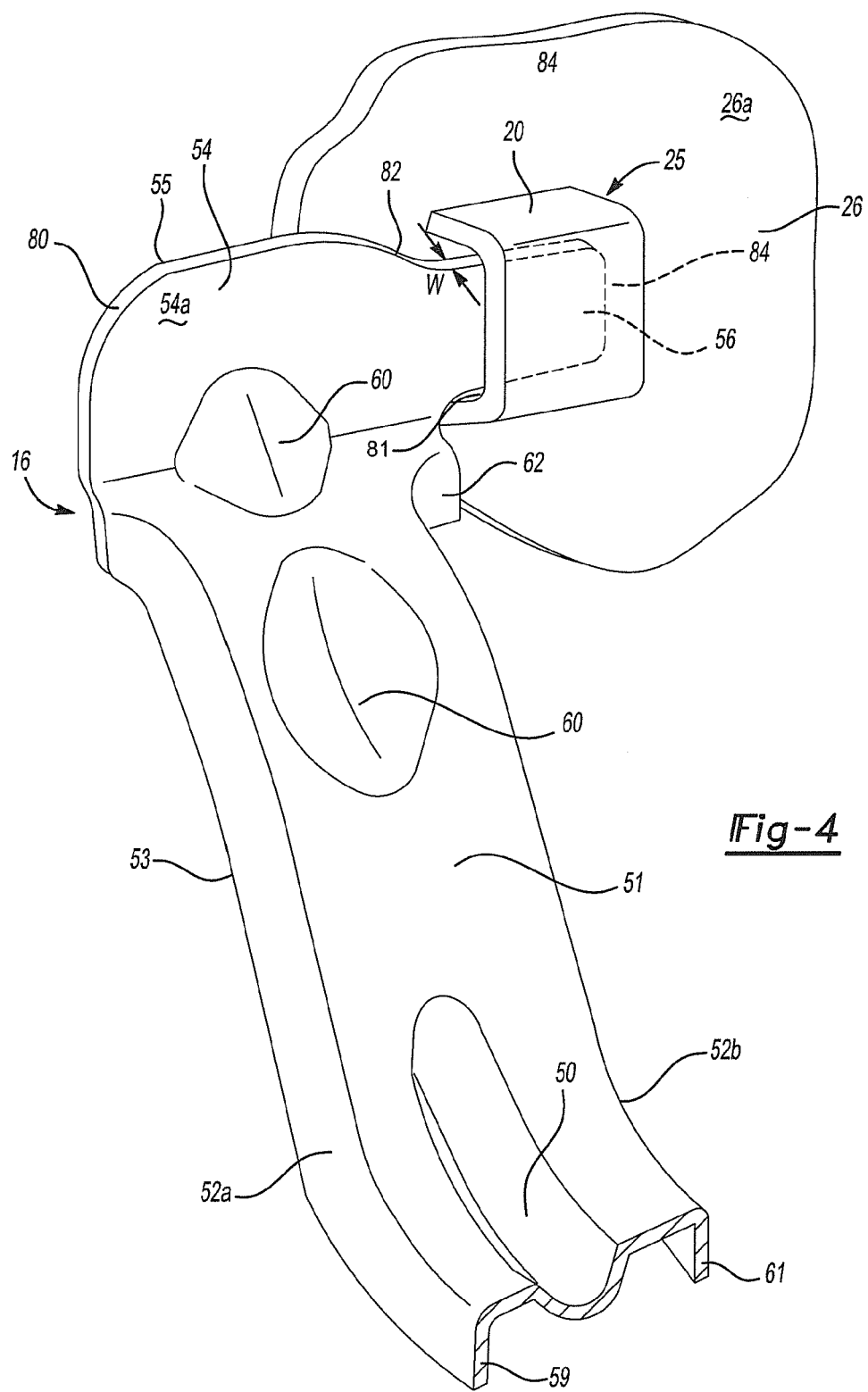
FIG. 4 illustrates the elongated bracket attaching to the center console.

The present invention relates to a means for attaching a center console to the main body of a vehicle. An elongated bracket is provided for attachment to a vehicle shifter. The center console is then mounted onto the elongated bracket attached to the shifter. The elongated bracket includes protrusions and the center console includes attachment members for accepting the protrusions on the elongated bracket. The protrusions on the elongated bracket connect to the attachment member in a snap fit engagement. The pressure exerted on an inner wall of the attachment member on a first surface of the protrusion thereby snap fits and secures the console assembly to the bracket.

FIG. 1 illustrates an exploded perspective view of the present invention. The assembly 10 includes a console assembly 12 and a shifter assembly 14. The elongated bracket 16 is provided mounted to the shifter assembly 14. The shifter assembly 14 is mounted to the main body 18 of the vehicle. The console assembly 12 includes the console compartment 70 having a lid 72 and a housing 74. Various components 76 and storage 78 may also be provided on the console assembly 12.

The console assembly 12 further includes two elongated arms 26, 28 extending to the front of the vehicle. The elongated arms 26, 28 run parallel and are generally spaced apart from one another. The elongated arms 26, 28 include a free end 26b, 28b and an attached end 28c mounted to a housing 74 of the console compartment 70. The arms 26, 28 each include an inner surface 26a, 28a. The inner surfaces 26a, 26b are planar. The elongated arms 26, 28 each include an upper edge 26d, 28d. The elongated portions further include a lower edge 26e and a lower edge 28e.

The inner surfaces 26a, 28a each include an attachment bracket 25, 27. The attachment brackets 25, 27 are generally U-shaped in cross section. The attachment brackets 25, 27 may also be a pocket having only one opening. The attachment bracket 25 includes a planar surface 20 and corresponding planar surfaces attaching to the inner surface 26a shown at reference numerals 20a, 20b. The attachment bracket 25 is molded into the surface 26a of the elongated arm 26.

Attachment bracket 27 includes a main planar surface 22 and corresponding side planar surfaces 22a, 22b. The attachment bracket 27 is molded to the inside surface 28a of the extended portion 28. The cross section of the attachment bracket 27 is generally U-shaped but may alternatively be V-shaped or more rectangular.

The shifter assembly 14 is provided having the bracket 16 mounted thereto. The shifter assembly 14 is mounted to the main body 18 of the vehicle. The shifter assembly 14 includes a shift lever 30 mounted to a base 32. The base 32 is mounted to a variety of structural features 34 and the housing or frame 42. The housing 42 connects to the main body 18 of the vehicle.

The elongated bracket 16 is generally U-shaped having a first end 55 and a second end 57. The first end 55 (and the corresponding second end 57) includes a main portion 54 and a protrusion 56. The main portion 54 includes a first surface 54a. The first surface 54a is generally planar. The protrusion 56 extends away from the main portion 54. The projection 56 is less wide than the main portion 54 located on the first end 55. The main portion 54 further includes an outer edge 80. The second end 57 includes identical structure as compared to the structure of the first end 55.

The elongated bracket further includes an upper surface 51 and a lower surface 53. An edge 52a, 52b is provided spacing apart the upper surface 51 and the lower surface 53. The upper surface 51 is generally planar throughout the length of the elongated bracket (with the exception of several structural features 50, 60). The lower surface 53 is also generally planar.

The first upper surface 51 further includes extensions 59, 60 extending away from the upper surface 51 of the elongated bracket 16. The edges or flanges 59, 61 add additional structural support to the bracket 16.

The protrusion 56 of the main portion 54 of the first end 55 of the elongated bracket 16 is adapted to fit within the attachment bracket 25 disposed and molded on the inner surface 26a of the elongated arm 26 of the console assembly 12. The protrusion 56 fits within the attachment bracket 25 in a snap fit engagement. Other structural elements, such as structural element 62, may further assist the snap fit engagement. The width W of the protrusion 56 is designed to create a secure fit within the inner surface 81 of the attachment bracket 25. When the protrusion 56 is inserted into the bracket 25, the protrusion 56 snaps into a secure position. Structural element 62 may also assist in connecting the elongated bracket 16 to the inner surface 26a. Corresponding structural elements on the inner surface 26a of the elongated portion 26 will promote said attachment. Structural elements located on the inner surface 26a may be a nub, protrusion, flange, or other structural element to assist in securing the bracket. The width W of the protrusion 56 is large enough to create a secure fit within the inner surface 81 of the attachment bracket 25. A compression within the attachment bracket 25 of the inner surface 81 of the attachment bracket 25 may be present to create a secure fit of the protrusion 56 within the attachment bracket 25.

Attachment bracket 27 located on the inner surface 28a of the elongated arm 28 on the console assembly 12 is identical to the protrusion 56 and the attachment bracket 25 located on the inner surface 26a of the elongated arm 26.

Figure 5:
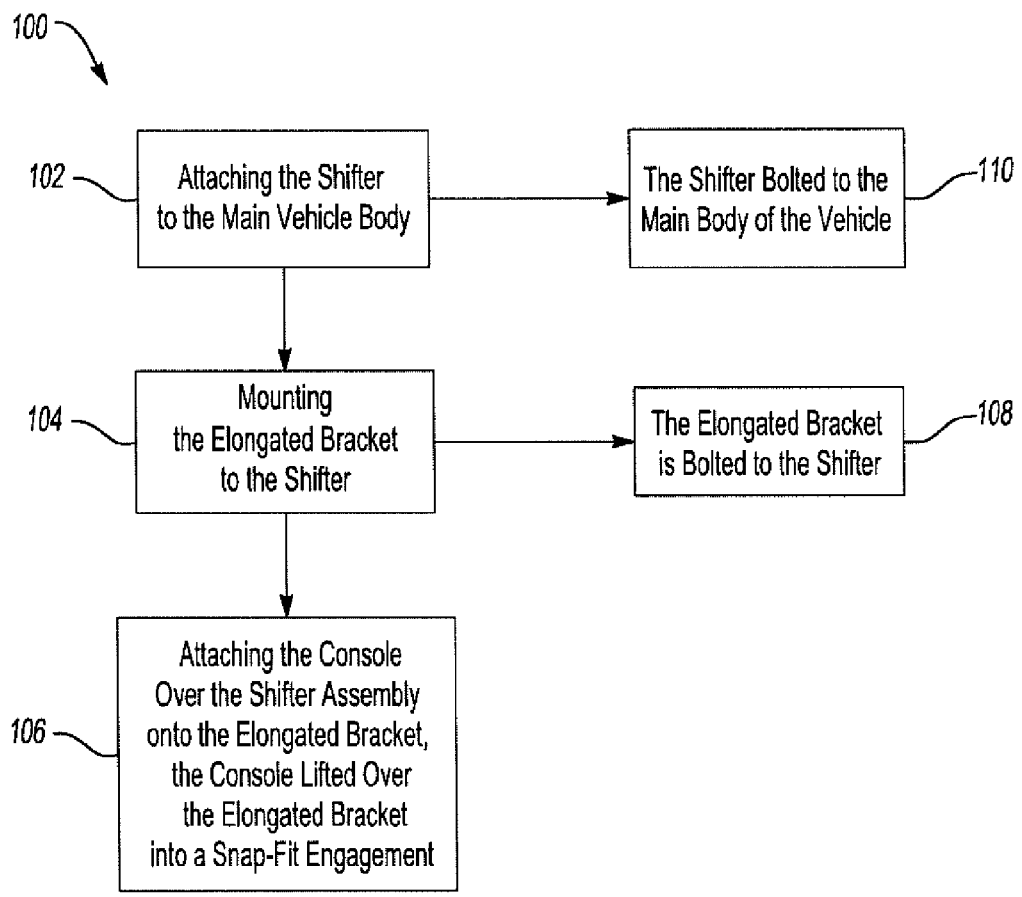
FIG. 5 is a flow chart illustrating the method of the present invention.

A method 100 of installing a console is shown in FIG. 5. The method utilizes an elongated bracket having at least two protrusions, a shifter assembly, and a main vehicle body, the console having corresponding structure to accept the protrusions, the method comprising the steps of attaching the shifter to the main vehicle body 102, mounting the elongated to the shifter 104, and attaching the console over the shifter assembly 106 onto the elongated bracket, the console lifted over the elongated bracket into a snap-fit engagement. The elongated bracket is bolted 108 on the shifter. Further, the shifter is bolted 110 to the main body.

This invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

The invention claimed is:

1. A vehicle assembly including a center console for installation around a vehicle shifter assembly, the assembly comprising:
    a main body, the main body including a shifter assembly mounted thereto;
    an elongated bracket mounted to the shifter assembly, the elongated bracket extending on a transverse axis within the vehicle, the elongated bracket having two spaced apart arms extending away from each other, the elongated bracket having at least two spaced apart protrusions, the spaced apart protrusions positioned on each of the spaced apart arms; and
    the console having at least two elongated portions, the elongated portions each having an inner wall, the inner wall of each of the at least two elongated portions having means to accept the at least two protrusions of the elongated bracket;
    wherein the console having the at least two elongated portions is mounted over the shifter onto the elongated bracket allowing the at least two protrusions of the elongated bracket to attach to the means to accept the at least two protrusions thereby eliminating the need for additional bolts.

2. The assembly of claim 1 wherein the elongated bracket is U-shaped.

3. The assembly of claim 1 wherein the elongated bracket further includes a plurality of apertures for accepting bolts.

4. The assembly of claim 3 wherein the elongated bracket attaches to the shifter assembly by means of a plurality of bolts.

5. The assembly of claim 1 wherein the elongated bracket further includes an attachment portion.

6. The assembly of claim 5 wherein the attachment portion of the elongated bracket includes a planar surface.

7. The assembly of claim 6 wherein the planar surface includes a plurality of bolt holes for attachment to the shifter assembly.

8. The assembly of claim 1 wherein the means to accept the at least two protrusions of the elongated bracket are cavities having corresponding shape and size to the at least two protrusions.

9. The assembly of claim 8 wherein the at least two protrusions and the corresponding cavities form a snap fit engagement.

10. A method of installing a console, the method utilizing an elongated bracket having at least two protrusions, a shifter assembly, and a main vehicle body, the console having corresponding structure to accept the protrusions, the method comprising the steps of:
    attaching the shifter to the main vehicle body;
    mounting the elongated bracket to a bottom portion of the shifter extending on a transverse axis within the vehicle; and
    attaching the console over the shifter assembly onto two spaced apart protrusions positioned on opposite ends of the elongated bracket, the console assembly extending on a longitudinal axis within the vehicle when attached onto the two spaced apart protrusions, the console lifted over the elongated bracket into a snap-fit engagement.

11. The method according to claim 10 wherein the elongated bracket is bolted to the shifter.

12. The method according to claim 10 wherein shifter is bolted to the main body of the vehicle.

* * * * *